United States Patent
Twilleager

(10) Patent No.: US 8,436,857 B2
(45) Date of Patent: May 7, 2013

(54) SYSTEM AND METHOD FOR APPLYING LEVEL OF DETAIL SCHEMES

(75) Inventor: Douglas Clay Twilleager, Campbell, CA (US)

(73) Assignee: Oracle America, Inc., Redwood City, CA (US)

( * ) Notice: Subject to any disclaimer, the term of this patent is extended or adjusted under 35 U.S.C. 154(b) by 819 days.

(21) Appl. No.: 12/582,265

(22) Filed: Oct. 20, 2009

(65) Prior Publication Data

US 2011/0090225 A1    Apr. 21, 2011

(51) Int. Cl.
*G06T 15/00* (2011.01)

(52) U.S. Cl.
USPC ........... 345/428; 345/419; 345/426; 345/587; 382/103; 382/154

(58) Field of Classification Search .................. 345/419, 345/426, 428, 587; 382/103, 154
See application file for complete search history.

(56) References Cited

U.S. PATENT DOCUMENTS

| | | | |
|---|---|---|---|
| 7,362,330 B2 * | 4/2008 | Fossum et al. | 345/426 |
| 7,899,241 B2 * | 3/2011 | Baxes et al. | 382/154 |
| 7,912,248 B2 * | 3/2011 | Tanaka | 382/103 |
| 8,233,006 B2 * | 7/2012 | Grossman et al. | 345/587 |
| 8,243,073 B2 * | 8/2012 | Mejdrich et al. | 345/426 |

* cited by examiner

*Primary Examiner* — Phu K Nguyen
(74) *Attorney, Agent, or Firm* — Osha Liang LLP

(57) ABSTRACT

A method for level of detail in a 3D environment application involves establishing a tiered system for processing a graphical object at a distance from a perspective point. The tiered system comprises a first level and a second level, the first level for processing the graphical object at a first range from the perspective point, and the second level for processing the graphical object at a second range from the perspective point. The method also involves determining the distance of the graphical object from the perspective point, assigning, while rendering the graphical object and based on the distance, the graphical object to a corresponding level of the tiered system, and executing a virtual processor assigned to the graphical object. The virtual processor executes every frame when the graphical object is assigned to the first level, less than every frame when assigned to the second level, and displaying the graphical object.

20 Claims, 7 Drawing Sheets

SYSTEM AND METHOD FOR APPLYING LEVEL OF DETAIL SCHEMES

BACKGROUND

Displaying three dimensional graphics is a processor and memory intensive process. Each object must be displayed and updated each frame, thereby heavily reducing frame rates when many objects are being displayed at once. Enabling a program to have both high quality graphics and a high frame rate is a challenging task.

In previous systems, this has been accomplished using level of detail to reduce the number of pixels in a graphical object (e.g., reducing the resolution of textures used in the graphical object), thereby generating a graphical object of lesser quality to be displayed. This method increased frame rates but came at the cost of a noticeable decrease in quality. In addition, many modern computing systems rely on increased processor power, available memory, and other hardware improvements to increase frame rates in three-dimensional environments.

SUMMARY

In general, in one aspect, the invention relates to a method for level of detail in a 3D environment application. The method comprises establishing a tiered system, for processing a graphical object at a distance from a perspective point, comprising at least a first level and a second level, wherein the first level is for processing the graphical object at a first range from the perspective point, wherein the second level is for processing the graphical object at a second range from the perspective point, and wherein the first range is closer to the perspective point than the second range, determining, while rendering the graphical object, the distance of the graphical object from the perspective point, assigning, while rendering the graphical object and based on the distance, the graphical object to a corresponding level of the tiered system, executing a virtual processor assigned to the graphical object, wherein the virtual processor executes every frame when the graphical object associated with the virtual processor is assigned to the first level, and wherein the virtual processor executes less than every frame when the graphical object associated with the virtual processor is assigned to the second level, and displaying the graphical object.

In general, in one aspect, the invention relates to a computer readable storage medium storing instructions for level of detail in a 3D environment application. The instructions comprise functionality to establish a tiered system, for shading a graphical object at a distance from a perspective point, comprising at least a first shader and a second shader, wherein the first shader is for processing the graphical object at a first range from the perspective point, wherein the second shader is for processing the graphical object at a second range from the perspective point, and wherein the first range and the second range do not overlap, determine, while rendering the graphical object, the distance of the graphical object from the perspective point, assign, while rendering the graphical object and based on the distance, a shader to the graphical object, execute the shader assigned to the graphical object, wherein the first shader is configured to render higher quality shading than the second shader, and display the graphical object.

In general, in one aspect, the invention relates to a system for level of detail in a 3D environment application. The system comprises a memory, a processor, operatively connected to the memory and configured for a processing module for establishing a tiered system, for updating a 2D application texture in the 3D environment application at a distance from a perspective point, comprising at least a first level and a second level, wherein the first level is for updating the 2D application texture at a first range from the perspective point, wherein the second level is for updating the 2D application texture at a second range from the perspective point, and wherein the first range is closer to the perspective point than the second range, determining, while rendering the graphical object, the distance of the 2D application texture from the perspective point, assigning, while rendering the graphical object and based on the distance, the 2D application texture to the corresponding level of the tiered system, and receiving a new 2D application texture from a 2D application, wherein the 2D application executes independent of the 3D environment application, updating the 2D application texture, wherein the 2D application texture is updated every frame when the 2D application texture is assigned to the first level, and wherein the 2D application texture is updated less than every frame when the 2D application texture is assigned to the second level, and a rendering module, operatively connected to a display for displaying the 2D application texture.

Other aspects and advantages of the invention will be apparent from the following description and the appended claims.

DETAILED DESCRIPTION

Figure 1:
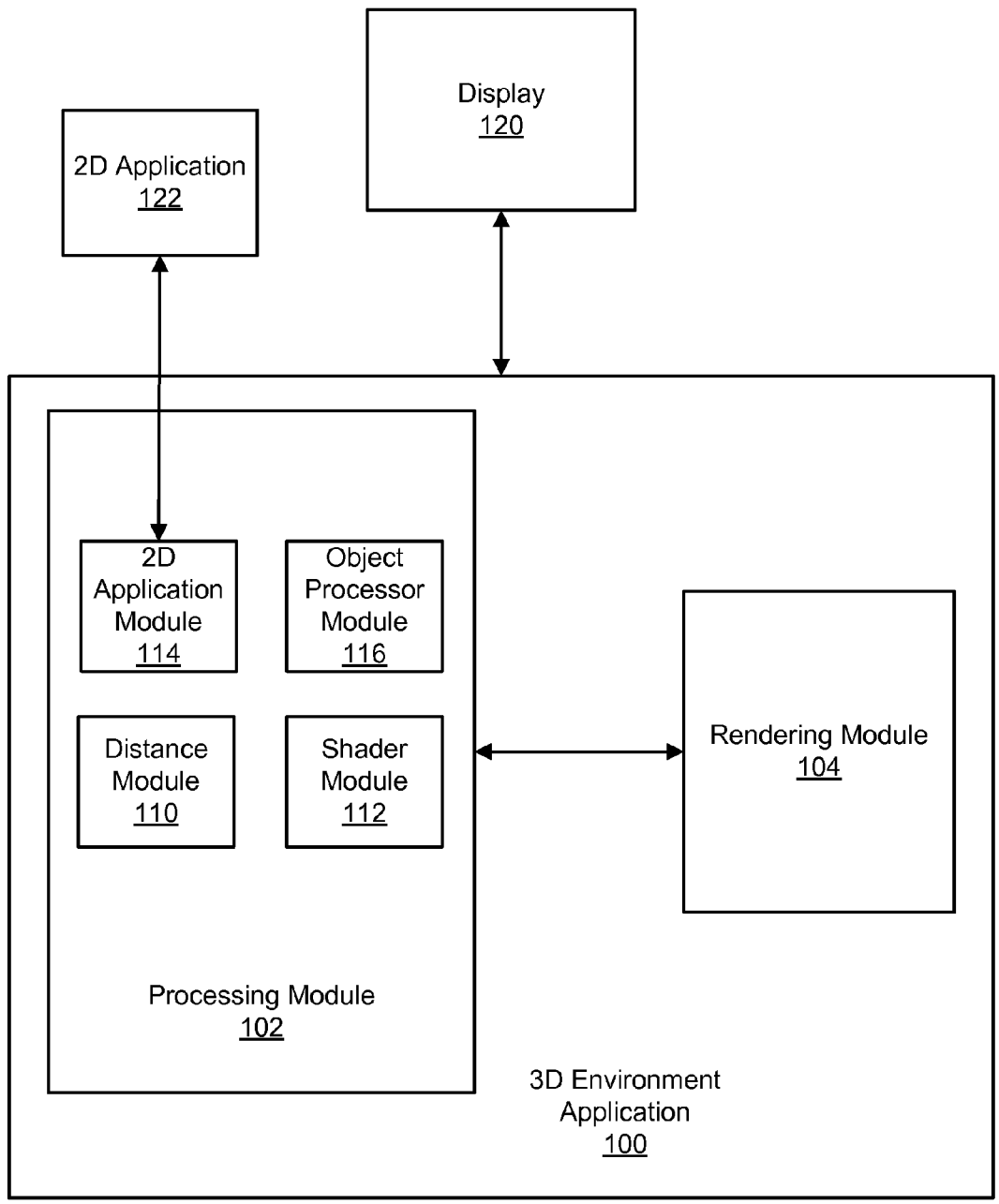
FIGS. 1-2 show diagrams of systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicated the description.

In general, embodiments of the invention provide a system and method for applying level of detail schemes to three-dimensional (3D) graphics. Specifically, level of detail schemes is applied to object processors, shaders, and 2D applications in a 3D environment. The level of detail scheme is applied by first establishing a tiered system configured to determine the level of detail that should be used for objects in the 3D environment. At this stage, the distance of an object from a perspective point is determined. The object is then assigned to the correct level and processed using the criteria of the level to which the object was assigned. In this instance, criteria refers to the quality and/or frequency of frame updates used to render a 3D graphical object (e.g., high quality, medium quality, and low quality shader, etc.). The level of detail system allows 3D graphical objects that are further away from a viewer to be displayed with less effort, while not impacting the quality of the 3D graphics. In this case, efficiency in rendering may be gained because the objects farther away are typically smaller than objects closer to the viewer. Additionally, distant objects may be less significant and may not receive the same level of scrutiny that closer objects receive. Thus, the detail of distant 3D graphical objects may be reduced without having a noticeable impact on the graphical quality of the overall image.

Throughout the following detailed description, the terms "3D graphical object," "3D object," and "graphical object" may be used interchangeably to refer to the same entity. Also, reference is may be made to frames or frame rate. A frame is single image of a series of images that are shown sequentially. Frame rate refers to the number of frames that are displayed per second.

FIG. 1 shows a system in accordance with one or more embodiments of the invention. As shown in FIG. 1, the system includes a 3D Environment Application (100), a Display (120), and a 2D Application (122). A 3D Environment Application (100) further includes a Rendering Module (104) and a Processing Module (102) which includes a Distance Module (110), a Shader Module (112), a 2D Application Module (114), and an Object Processor Module (116). Each of the aforementioned components of FIG. 1 is discussed below.

A 3D Environment Application (100) may be any application that renders, processes, or displays 3D graphics, or a component thereof. In one or more embodiments of the invention, a 3D Environment Application (100) may communicate with other applications (e.g., 2D Application (122)) or with other components such as a memory (not shown) or a processor (not shown). Additionally, a 3D Environment Application (100) may execute on a processor (not shown).

A Rendering Module (104) may be responsible for rendering any 3D graphics for a 3D Environment Application (100). In one or more embodiments of the invention, a Rendering Module (104) may be separate from a Processing Module (102). Alternatively, a Rendering Module (104) and a Processing Module (102) may be combined into a single module (not shown). A Display (120) may be any device, or portion of a device, capable of displaying 3D graphics (e.g., a liquid crystal display (LCD) screen, television (TV), Computer Monitor, etc).

In one or more embodiments of the invention, a Processing Module (102) may contain many components including, but not limited to, a Distance Module (110), a Shader Module (112), a 2D Application Module (114), and an Object Processor Module (116). Alternatively, some of these components may be located in another module or may be stand alone modules. A Processing Module (102) may be responsible for the processing of 3D graphics before they are rendered by a Rendering Module (104). In one or more embodiments of the invention, a Distance Module (110) may be responsible for determining the distance of any and all 3D graphical objects from a perspective point (not shown). In other words, a Distance Module (110) determines the distance between two points, where one point is the location from which the other point is perceived (i.e., a perspective point). In one or more embodiments of the invention, a Distance Module (110) may also determine if a 3D graphical object is not currently in view of the perspective point. For example, if a 3D graphical object is behind a larger 3D graphical object, and cannot be seen from the perspective point, then the object is not in view of the perspective point. Likewise, if an object is behind the perspective point (and thus not in the 3D scene), it may not be in view of the perspective point. In one or more embodiments of the invention, the objects that are viewable from the perspective point at a given time may depend on the type of perspective used (e.g., $1^{st}$ person, $3^{rd}$ person, etc . . . ), or any other relevant factors. The remaining modules (Shader Module (112), 2D Application Module (114), and Object Processor Module (116)) are responsible for creating and managing tiered systems (not shown) for level of detail schemes. Although there are minor differences in the tiered system for each module, the tiered system will be explained first, in general, in order to provide a better understanding of the invention.

Figure 2:
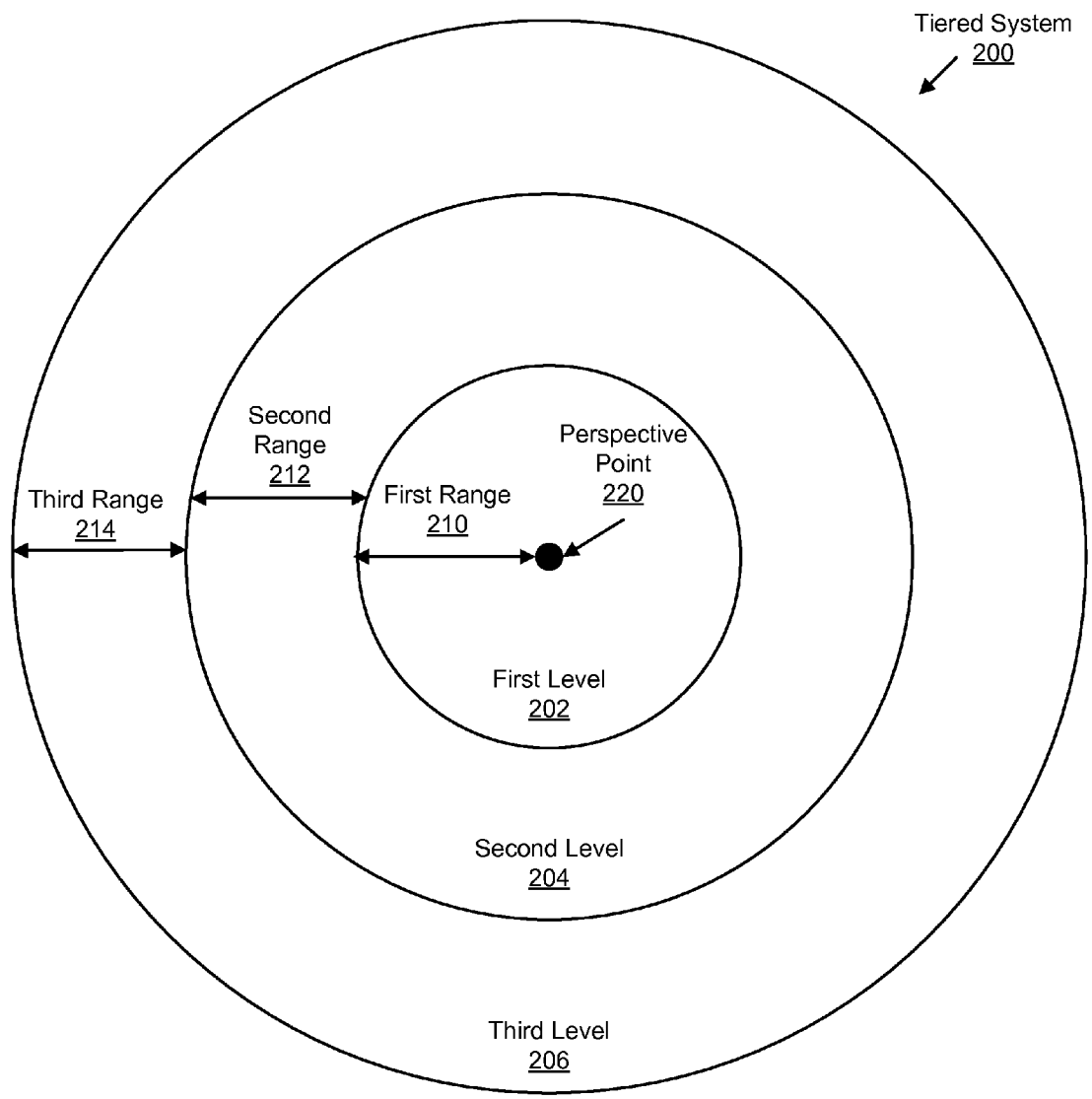

FIG. 2 shows a system in accordance with one or more embodiments of the invention. Specifically, FIG. 2 shows an example of a Tiered System (200) for level of detail schemes. In one or more embodiments of the invention, a Tiered System (200) may vary between modules. For example, a Tiered System (200) of FIG. 2 shows three levels (First Level (202), Second Level (204), and Third Level (206)), but one skilled in the art will appreciate that there may be two, four, or any number of levels. Additionally, there may be a different number of levels between a number of tiered systems, where each tiered system is managed by a different module. Alternatively, each module may have the same number of levels in its tier system. A Tiered System (200) contains First Level (202), Second Level (204), Third Level (206), First Range (210), Second Range (212), Third Range (214), and Perspective Point (220). Each of these components is discussed below.

The levels (First Level (202), Second Level (204), and Third Level (206)) of a Tiered System (200) may be used to implement level of detail schemes for 3D graphics. Specifically, each level is assigned different criteria for rendering the same aspect of a 3D graphical object at different distances from a Perspective Point (220). For example, the different criteria may relate to shaders, 2D textures in a 3D environment, or object processing. In this example, all three levels may be assigned different quality shaders (or other criteria). In one or more embodiments of the invention, there may be multiple tier systems working together on the same graphical object to implement level of detail for variety of aspects of the graphical object. A Perspective Point (220), as described above, is the point from which a 3D graphical object is viewed, and from which the distances of 3D graphical objects are calculated. In one or more embodiments of the invention, a Perspective Point (220) is not stationary (i.e., the perspective point may be dynamic). For example, a Perspective Point (220) may move forward or backward in a 3D environment. Alternatively, a Perspective Point (220) may change the direction the Perspective Point (220) is facing (e.g., a 90 degree turn), thereby causing some 3D graphical objects to be out of sight. It will be apparent to one of ordinary skill in the art that the 3D graphical objects that are out of view may vary based on a variety of factors.

In one or more embodiments of the invention, a First Level (202) is closest to a Perspective Point (220) and is therefore assigned the highest quality criteria, relative to the other levels (Second Level (204) and Third Level (206)). In this case, a Second Level (204) is farther from a Perspective Point (220), and therefore is assigned lesser quality criteria, relative to a First Level (202). A Third Level (206) is the farthest from a Perspective Point (220), and is therefore assigned the lowest quality criteria, relative to the other levels (First Level (202) and Second Level (204)). It will be apparent to one of ordinary skill in the art that there may be any number of levels and that the levels may have varying ranges and as such, the invention should not be limited to the example discussed above.

Each level has a range of distances (First Range (210), Second Range (212), and Third Range (214)) for which the criteria of that level are applied to the 3D graphical object. In one or more embodiments of the invention, the ranges (First Range (210), Second Range (212), and Third Range (214)) may be established before run-time of the 3D environment. Alternatively, the ranges (First Range (210), Second Range (212), and Third Range (214)) may be established at run-time of the 3D environment. In one or more embodiments of the invention, the ranges (First Range (210), Second Range (212), and Third Range (214)) may be dynamically adjusted based on the number of 3D graphical objects being displayed, or any other relevant factor. For example, if there are a large number of graphical objects being displayed, then a First Range (210) may be reduced in size, while increasing the size of a Second Range (212), thereby reducing the amount of processing required to display the graphical objects because less graphical objects are being displayed at maximum quality.

Returning to FIG. 1, in one or more embodiments of the invention, a Shader Module (112) is responsible for maintaining a tiered system for level of detail for shaders. In one or more embodiments of the invention, a Shader Module (112) maintains a tiered system of three levels for level of detail. In another example, two, four, or any number of levels may be used in the tired system. In one or more embodiments of the invention, the levels are designated shaders before runtime. Alternatively, the shader to be used on the graphical object may be determined during runtime, based on distance. In one or more embodiments of the invention, the first level may be designated the highest quality shader, relative to the other levels, for use in rendering a graphical object. The second level may have a medium quality shader, relative to the other levels, for use in rendering a graphical object. The third level may have the lowest quality shader, relative to the other levels, for use in rendering a graphical object. In one or more embodiments of the invention, the distances at which each level is applied may change dynamically.

In one or more embodiments of the invention, a 2D Application Module (114) manages a tiered system for level of detail for 2D textures in a 3D environment. In one or more embodiments of the invention, a 2D Application Module (114) is configured to communicate with a 2D Application (122). A 2D Application (122) may be any software application (e.g., a web browser, a music player, a slideshow application, etc). In one or more embodiments of the invention, a 2D Application (122) may be located on the same system as a 3D Environment Application (100). Alternatively, a 2D Application (122) may be located on a different system. In one or more embodiments of the invention, a 3D Environment Application (100) allows for output from a 2D Application (122) to be displayed in the 3D environment. In one or more embodiments of the invention, this may be accomplished by rendering 2D graphics from a 2D Application (122) into a texture map, and then applying the texture map to a 3D graphical object. It will be apparent to one of ordinary skill in the art that there are a variety of manners for displaying the graphics of a 2D Application (122) in a 3D environment. In one or more embodiments of the invention, a 2D Application Module (114) may be configured to apply level of detail processing to the frequency of frame updates to the texture map of the 2D Application (122).

In one or more embodiments of the invention, a 2D Application Module (114) may maintain a tiered system including three levels. Alternatively, a 2D Application Module (114) may maintain a tiered system including two, four, or any number of levels. In the first level of the tiered system, the texture map of a 2D Application (122) may be updated every frame. In the second level of the tiered system, the texture map of a 2D application (122) may be updated less than every frame (e.g., every other frame, every $5^{th}$ frame, every $10^{th}$ frame). In the third level of the tiered system, the texture map of a 2D application (122) may not be updated. It will be apparent to one of ordinary skill in the art that textures may be updated at different frequencies, and as such, the invention should not be limited to the example discussed above. In one or more embodiments of the invention, a 2D application (122) may provide updated textures for every frame, regardless of how frequently the texture is used for the displayed 3D graphical object. In one or more embodiments of the invention, the frequency of texture updates associated with each level may be modified dynamically. Alternatively, the frequency of texture updates associated with each level may be configured before runtime. In one or more embodiments of the invention, the ranges at which each level applies may be updated dynamically, based on a variety of relevant factors (e.g., number of objects on the screen, frame rate, etc.).

In one or more embodiments of the invention, an Object Processor Module (116) may be responsible for maintaining a tiered system for level of detail for object processing. In one or more embodiments of the invention, the object processing system may be separate from the rendering system. In one or more embodiments of the invention, each object in the 3D environment may be assigned a virtual processor. Alternatively, virtual processors may be assigned to each level of the tiered system. In one or more embodiments of the system, the tiered system maintained by a Object Processor Module (116) may include four levels. Alternatively, the tiered system may have two, three, five, or any number of levels. In one or more embodiments of the invention, the first level may allow the object processors (i.e., the virtual processors) to execute for every displayed frame. The second level may allow the object processors to execute for less than every displayed frame (i.e., every other frame, every $3^{rd}$ frame). In one or more embodiments of the invention, the third level may allow the object processors to execute less frequently than the second level (i.e., every $5^{th}$ frame, every $10^{th}$ frame). The fourth level may halt object processing of a 3D graphical object. It will be apparent to one of ordinary skill in the art that there are a variety of frequencies at which object processors may execute, and as such, the invention should not be limited to the examples discussed above. In one or more embodiments of the invention, the criteria for executing the object processors may change dynamically during runtime. In one or more embodiments of the invention, the ranges at which each level applies may change dynamically, based on any relevant factor (e.g., number of objects on the screen, frame rate).

Figure 3:
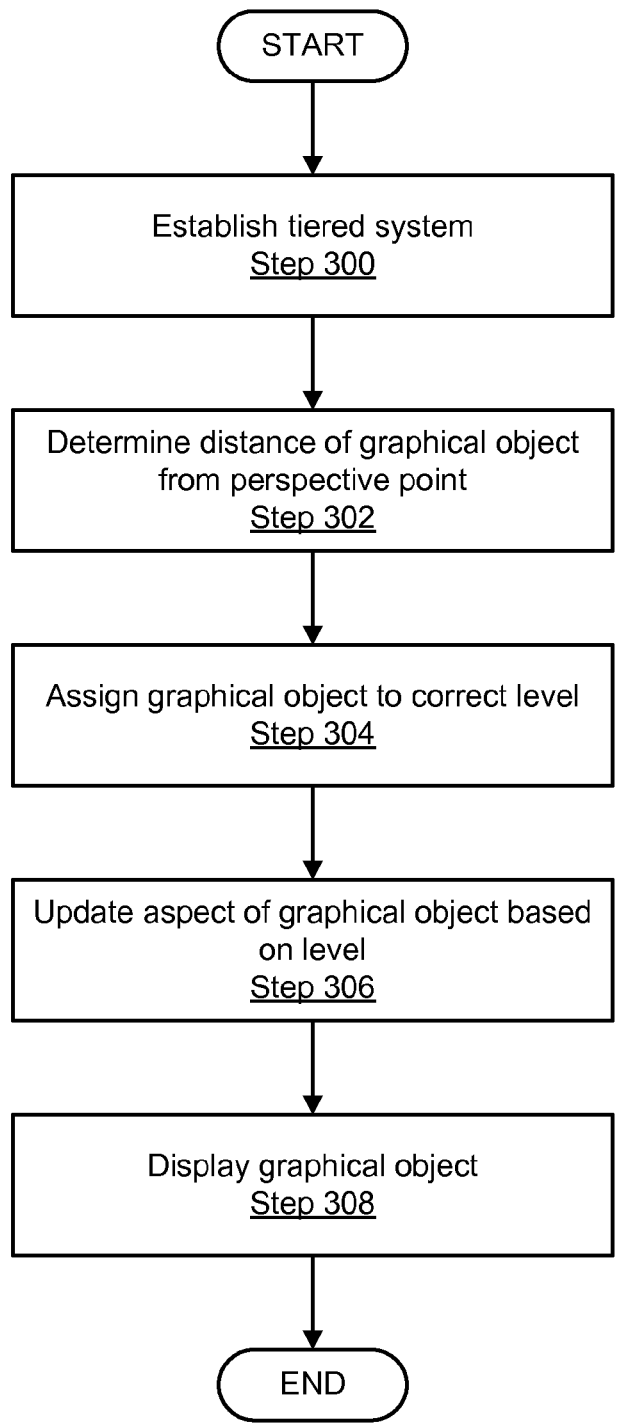
FIG. 3 shows a flowchart of a method in accordance with one or more embodiments of the invention.

FIG. 3 shows a flowchart of a method for implementing level of detail schemes, in accordance with one or more embodiments of the invention. The method of FIG. 3 may be implemented, for example, using the systems of FIGS. 1 and 2. In one or more embodiments of the invention, one or more of the steps shown in FIG. 3 may be omitted, repeated, and/or performed in a different order than the order shown in FIG. 2. Accordingly, the scope of the invention should not be considered limited to the specific arrangement of steps shown in FIG. 2.

In Step 300, a tiered system is established. In one or more embodiments of the invention, both the distances (i.e., the range) and the graphics criteria for each level are established. Alternatively, the graphics criteria for each level are established. In one or more embodiments of the invention, the distances and the graphics criteria may be established for each graphical object. For example, a tiered system may be established for both shaders and object processing for each graphical object. It will be apparent to one of ordinary skill in the art that there are many combinations of tiered systems that may be established at the same time, and as such the invention should not be limited to the example discussed above. In one or more embodiments of the invention, the tiered system established in the step may have any number of levels.

In Step 302, the distance of a graphical object from a perspective point is determined. In one or more embodiments of the invention, the distance from the perspective point may be determined for each 3D graphical object in the 3D environment. Further, the visibility of each object from the perspective point (e.g., the 3D graphical object is behind the perspective point, the 3D graphical object is behind a larger 3D graphical object, etc.) may be determined. In one or more embodiments of the invention, the determination of distance may be performed before each frame is displayed. Alternatively, the determination of distance may be done less frequently than every frame, may be done for some graphical objects but not other graphical objects, or may be done in any other suitable manner. For example, the distance may only be determined if the perspective point has changed, or if the location of a 3D graphical object has changed. It will be apparent to one of ordinary skill in the art that there are a variety of methods to determine how and when to calculate distance, and as such, the invention should not be limited to the examples discussed above.

In Step 304, each 3D graphical object is assigned to the correct level of the tiered system. In one or more embodiments of the invention, a correct level may be assigned to each 3D graphical object in the 3D environment. Further, a correct level may be assigned for each of a number of tiered systems associated with an object (e.g., shaders, object processors, and 2D application textures, etc.). In one or more embodiments of the invention, Step 304 may be performed for every frame. Alternatively, Step 304 may be performed periodically, based on a schedule or some other suitable criteria.

In Step 306, aspects of a 3D graphical object are updated based on the criteria of the 3D graphical object's assigned level. In one or more embodiments of the invention, each 3D graphical object in the 3D environment may be updated based on a corresponding level of the tiered system. Alternatively, only a subset of the 3D graphical objects may be updated based on the criteria. In one or more embodiments of the invention, many aspects (i.e., shaders, object processing, 2D textures) of the 3D graphical object may be updated simultaneously. Alternatively, each aspect of a 3D graphical object may be updated individually (i.e., asynchronously).

In Step 308, the graphical object is displayed. For example, the graphical object may be displayed on any device capable of displaying objects.

Figure 4A:
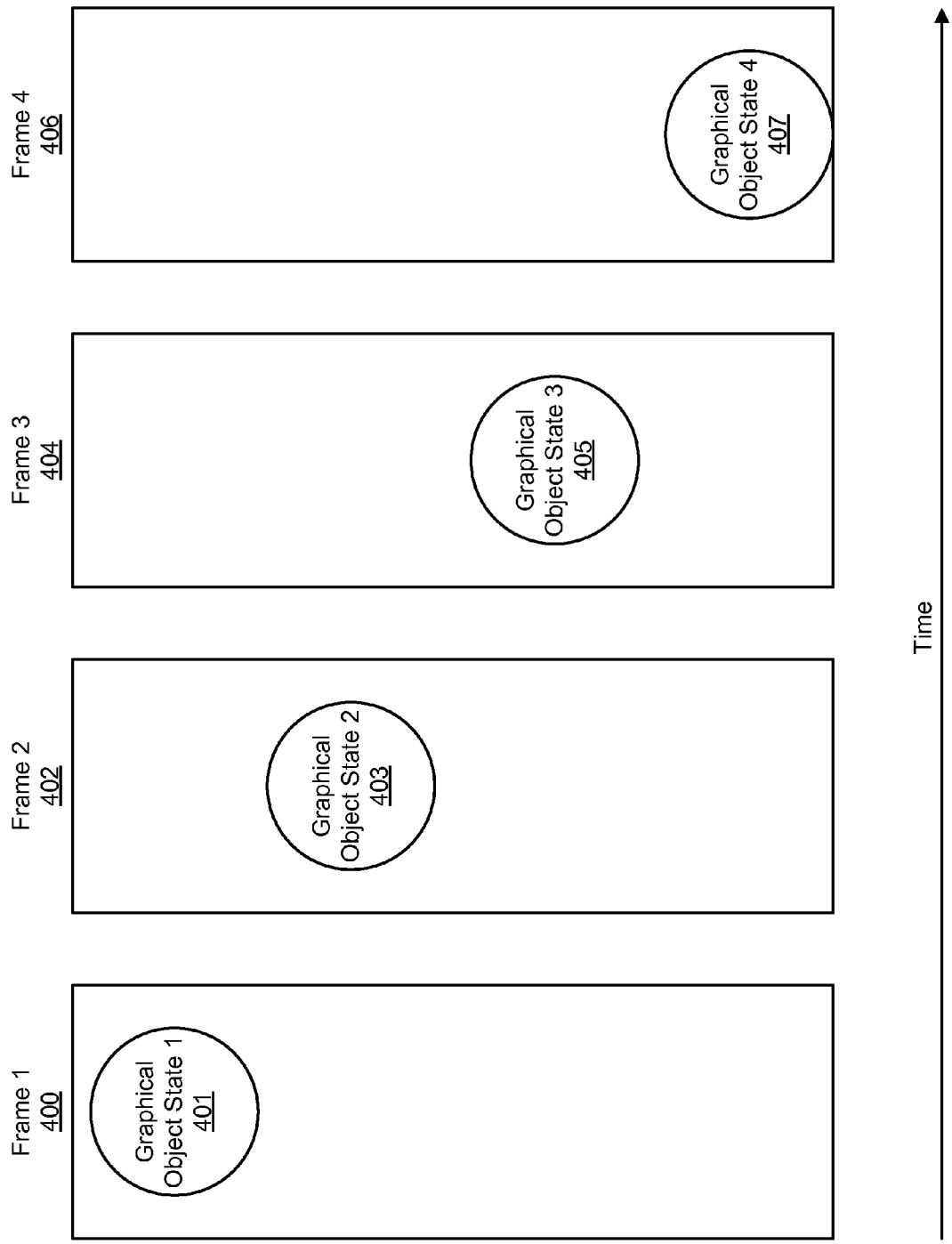
FIGS. 4A-4C show examples in accordance with one or more embodiments of the invention.
Figure 4B:
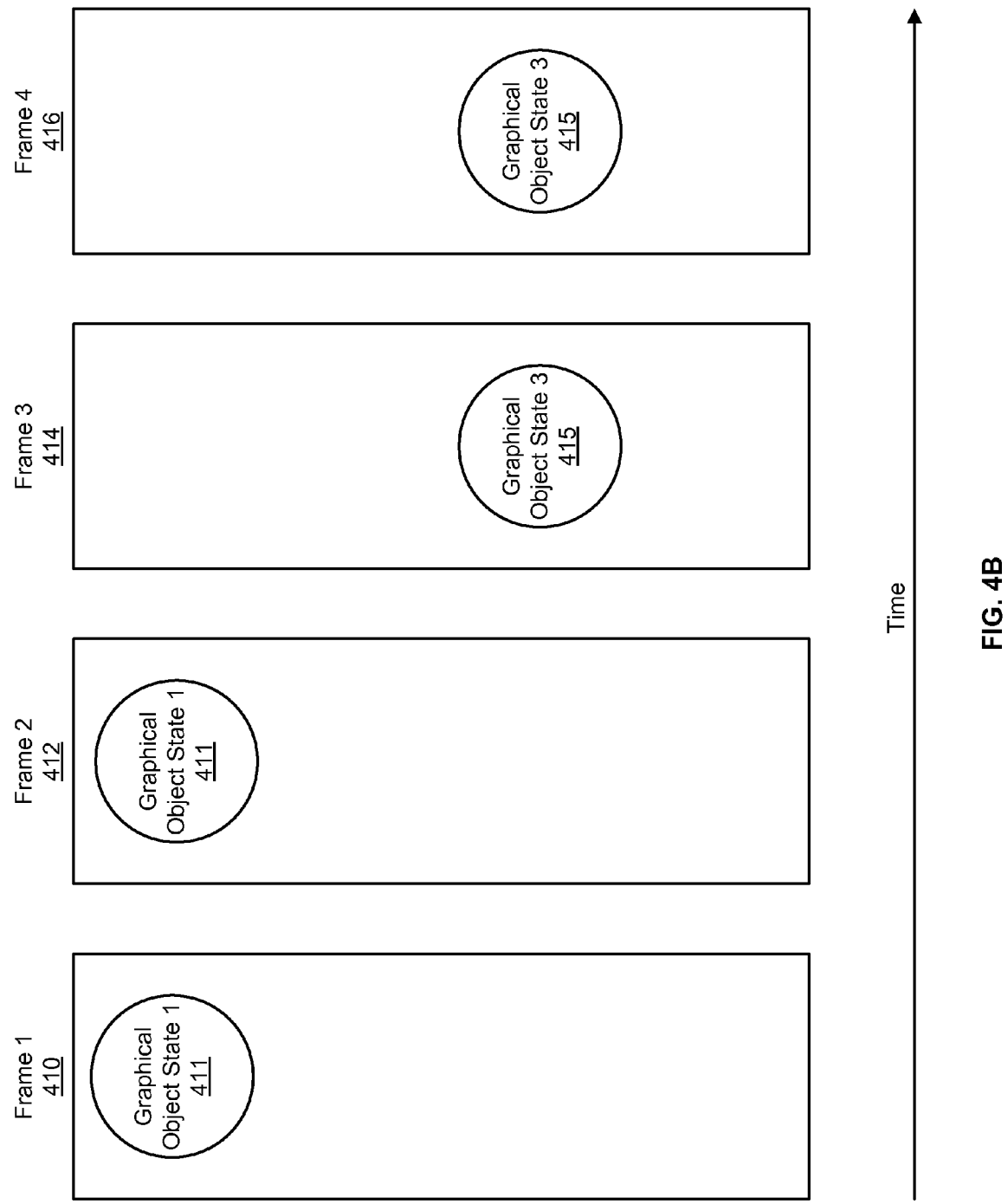
Figure 4C:
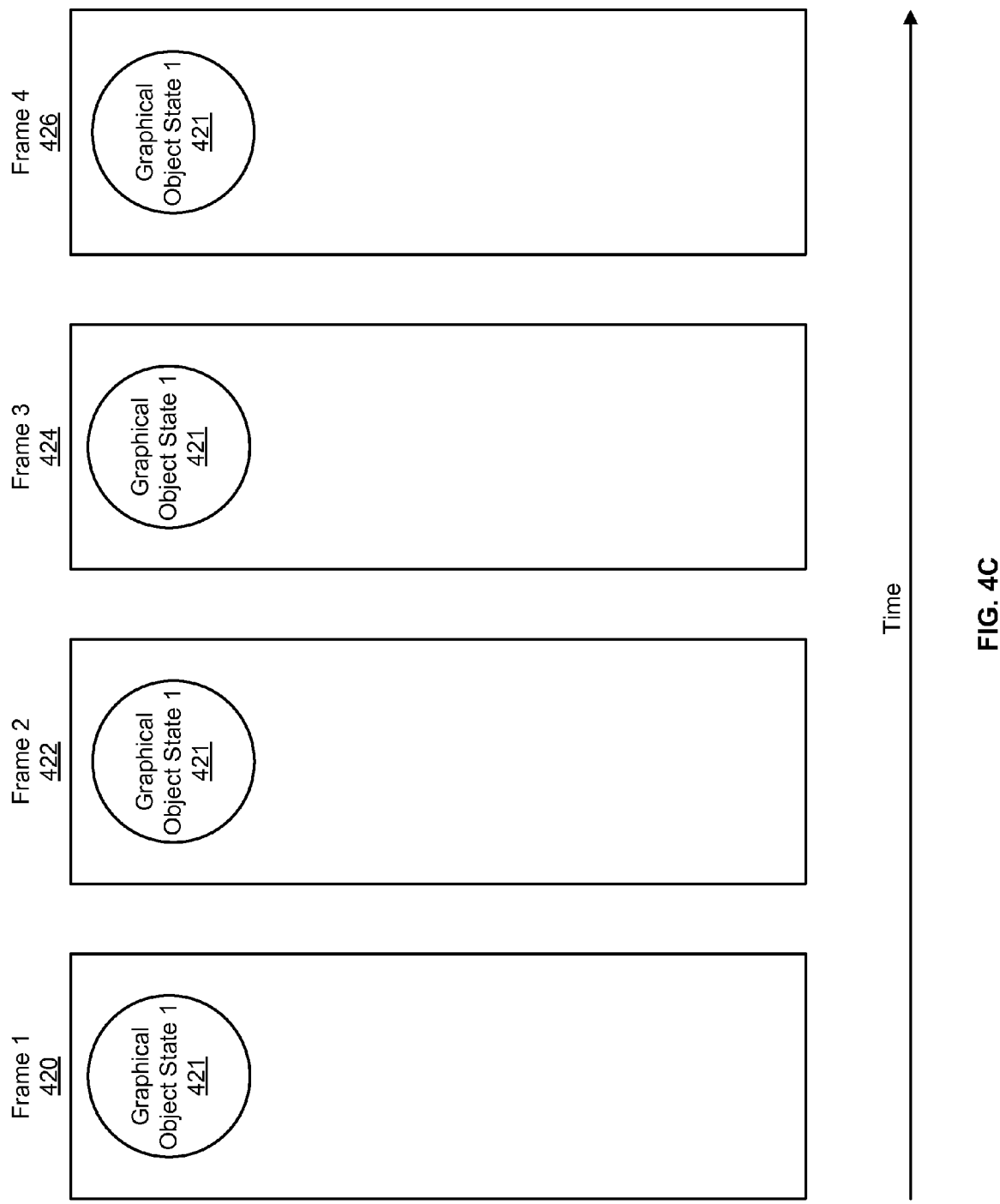

FIGS. 4A-C show examples in accordance with one or more embodiments of the invention. Specifically, the examples in FIGS. 4A-C show a simplified example of level of detail as applied to object processors. Each figure shows a graphical object being displayed over a number of frames, but at different distances from the perspective point. Specifically, the graphical object in FIGS. 4A-C is falling from the top to the bottom of the frame. In FIG. 4A the graphical object is within the range of the first level of a tiered system. In FIG. 4B the graphical object is within the range of a second level of a tiered system. In FIG. 4C the graphical object is within the range of a third level of a tiered system. For the purposes of this example, neither the graphical object nor the perspective point moves closer to or farther from each other (i.e., the distance between the graphical object and a perspective point does not change). It will be apparent to one of ordinary skill in the art that the distance between a graphical object and the perspective point may change, and as such, the invention should not be limited to these examples. In actuality, the effect of the invention may be much less apparent than in this simplified example.

Before any frame of FIGS. 4A-C is displayed the tiered system for object processing is established. In these examples, the first level has its criteria set to execute every frame, and is for objects at a range of 0-50 feet from the perspective point. The second level has its criteria set to execute every other frame, and is for objects at a range of 51-100 feet from the perspective point. The third, and final, level has its criteria set to not execute, and is for objects at a range of 101 feet or more from the perspective point. Additionally, a virtual processor is assigned to the graphical object. In one or more embodiments of the invention, the virtual processor may be assigned to the graphical object during runtime.

The example in FIG. 4A shows a graphical object falling through the air of a 3D environment. Specifically, in FIG. 4A, the graphical object is 25 feet away from the perspective point, and thus is within the range of the first level of the tiered system. In Frame 1 (400) Graphical Object State 1 (401) is at the top of the frame. After Frame 1 (400) is displayed, the virtual processor for Graphical Object State 1 (401) executes, and Graphical Object State 1 (401) transitions into Graphical Object State 2 (403). In Frame 2 (402), Graphical Object State 2 (403) has fallen a third of the way down the frame. After Frame 2 (402) is displayed, the virtual process for Graphical Object State 2 (403) executes, and Graphical Object State 2 (403) transitions into Graphical Object State 3 (405). In Frame 3 (404), Graphical Object State 3 (405) has fallen two thirds of the way down the frame. After Frame 3 (404) is displayed, the virtual processor for Graphical Object State 3 (405) executes, and Graphical Object State 3 (405) transitions into Graphical Object State 4 (407). In Frame 4 (406), Graphical Object State 4 (407) has reached the bottom of the frame.

The example in FIG. 4B shows the same graphical object falling through the air of a 3D environment as in FIG. 4A. However, in FIG. 4B, the graphical object is 75 feet away from the perspective point, and thus is within the range of the second level of the tiered system. In Frame 1 (410) Graphical Object State 1 (411) is at the top of the frame. After Frame 1 (410) is displayed, the virtual processor of Graphical Object State 1 (411) does not execute, because the criteria of the second level is being applied, and the virtual processor for the graphical object only executes every other frame. Accordingly, the virtual processor does not execute, and the graphical object does not transition into another state. In Frame 2 (412), Graphical Object State 1 (411) has not moved. After Frame 2 (412) is displayed, the virtual processor executes, pursuant to the criteria of the second level, and Graphical Object State 1 (411) transitions into Graphical Object State 3 (415). Graphical Object State 2 (not shown) is skipped because the graphical object still moved down the screen, but was merely not updated to reflect that in the display. In Frame 3 (414), Graphical Object State 3 (415) is two thirds of the way down the frame. After Frame 3 (414), the virtual processor for Graphical Object State 3 (415) does not execute, pursuant to the criteria of the second level. Accordingly, in Frame 4 (416) Graphical Object State 3 (415) has not moved.

The Example in FIG. 4C shows the same graphical object falling through the air as in FIGS. 4A and 4B. However, in FIG. 4C, the graphical object is 125 feet away from the perspective point, and thus is within the range of the third level of the tiered system. In Frame 1 (420) Graphical Object State 1 (421) is at the top of the frame. Pursuant to the criteria of the third level, object processing is turned off. Accordingly, the virtual processor does not execute. Therefore, in Frame 2

(422) Graphical Object State 1 (421) is displayed. In Frame 3 (424), Graphical Object State 1 (421) is displayed again. In Frame 4 (426), Graphical Object State 1 (421) is displayed again.

While the above examples refer only to object processing, the same process and procedures would apply to shaders and 2D texture updates. For the sake of brevity and simplicity, specific examples for shaders and 2D texture updates are not included.

Figure 5:
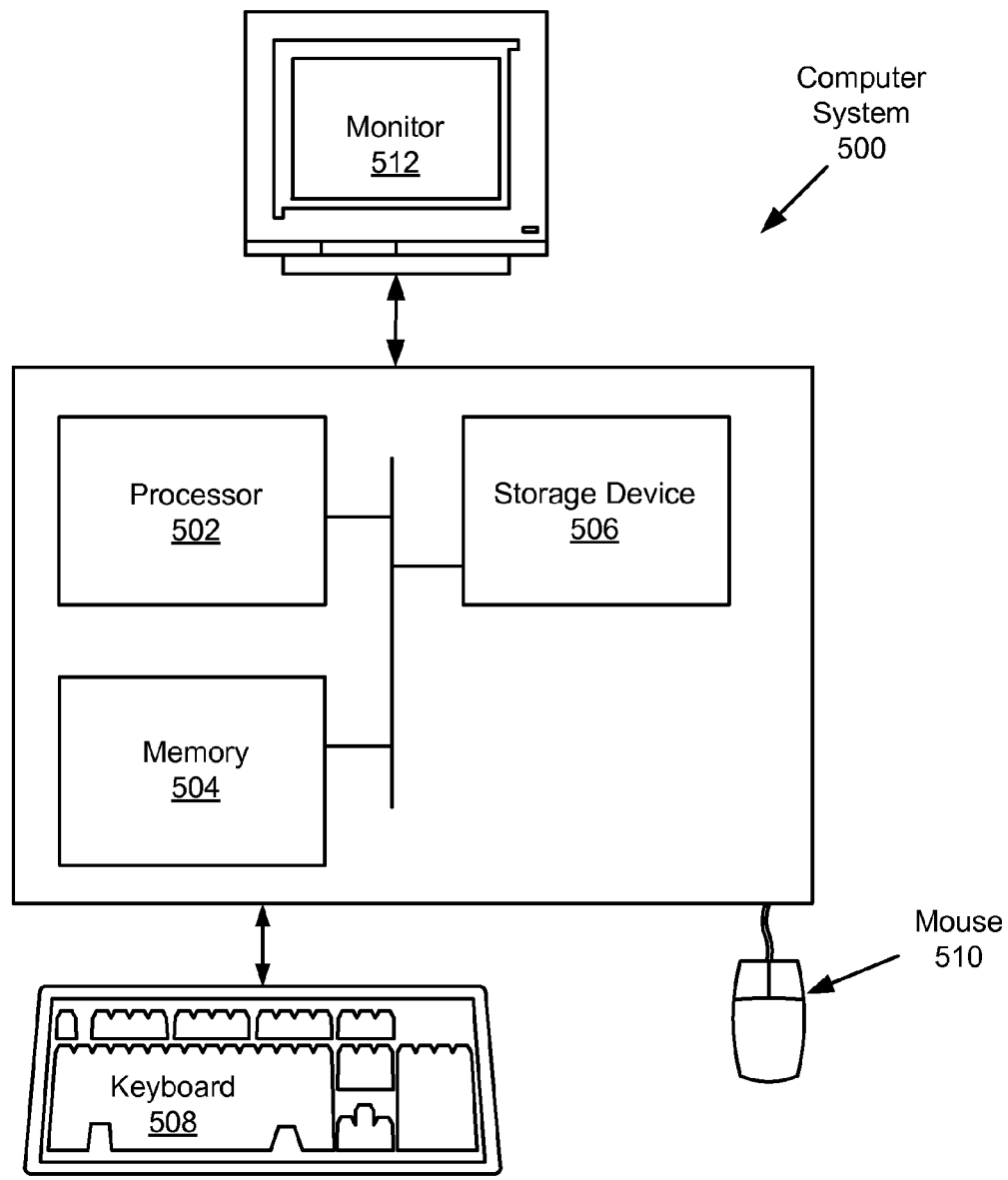
FIG. 5 shows a diagram of a computer system in accordance with one or more embodiments of the invention.

The invention may be implemented on virtually any type of computing device regardless of the platform being used. For example, as shown in FIG. 5, a computer system (500) includes a processor (502), associated memory (504), a storage device (506), and numerous other elements and functionalities typical of today's computers (not shown). The computer system (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for level of detail in a 3D environment application, comprising:
    establishing a tiered system, for processing a graphical object at a distance from a perspective point, comprising at least a first level and a second level,
        wherein the first level is for processing the graphical object at a first range from the perspective point,
        wherein the second level is for processing the graphical object at a second range from the perspective point, and
        wherein the first range is closer to the perspective point than the second range;
    determining, while rendering the graphical object, the distance of the graphical object from the perspective point;
    assigning, while rendering the graphical object and based on the distance, the graphical object to a corresponding level of the tiered system;
    executing a virtual processor assigned to the graphical object,
        wherein the virtual processor executes every frame when the graphical object associated with the virtual processor is assigned to the first level, and
        wherein the virtual processor executes less than every frame when the graphical object associated with the virtual processor is assigned to the second level; and
    displaying the graphical object.

2. The method of claim 1, wherein the first range and the second range are configurable while rendering the graphical object.

3. The method of claim 1, wherein the tiered system further comprises a third level,
    wherein the third level is for a graphical object at a third range from the perspective point,
    wherein the second range is closer to the perspective point than the third range, and
    wherein the first range, the second range, and the third range do not overlap.

4. The method of claim 3, wherein the virtual processor is turned off when the graphical object associated with the virtual processor is assigned to the third level.

5. The method of claim 3, wherein the third range comprises graphical objects that are not visible from the perspective point.

6. The method of claim 1, wherein a complexity of the graphical object does not change.

7. The method of claim 1, further comprising:
    establishing a tiered system, for shading a graphical object at a distance from a perspective point, comprising at least a first shader and a second shader,
        wherein the first shader is for processing the graphical object at a first range from the perspective point,
        wherein the second shader is for processing the graphical object at a second range from the perspective point, and
        wherein the first range is closer to the perspective point than the second range;
    determining, while rendering the graphical object, the distance of the graphical object from the perspective point;
    assigning, while rendering the graphical object and based on the distance, a shader to the graphical object;
    executing the shader assigned to the graphical object, wherein the first shader is configured to render higher quality shading than the second shader; and
    displaying the graphical object.

8. The method of claim 1, further comprising:
    establishing a tiered system, for updating a 2D application texture in the 3D environment application at a distance from a perspective point, comprising at least a first level and a second level,
        wherein the first level is for updating the 2D application texture at a first range from the perspective point,
        wherein the second level is for updating the 2D application texture at a second range from the perspective point, and
        wherein the first range is closer to the perspective point than the second range;
    determining, while rendering the graphical object, the distance of the 2D application texture from the perspective point;
    assigning, while rendering the graphical object and based on the distance, the 2D application texture to the corresponding level of the tiered system;
    receiving a new 2D application texture from a 2D application, wherein the 2D application executes independent of the 3D environment application;
    updating the 2D application texture, wherein the 2D application texture is updated every frame when the 2D application texture is assigned to the first level, wherein the 2D application texture is updated less than every frame when the 2D application texture is assigned to the second level; and displaying the 2D application texture.

9. A computer readable storage medium storing instructions for level of detail in a 3D environment application, the instructions comprising functionality to:

establish a tiered system, for shading a graphical object at a distance from a perspective point, comprising at least a first shader and a second shader, wherein the first shader is for processing the graphical object at a first range from the perspective point, wherein the second shader is for processing the graphical object at a second range from the perspective point, and wherein the first range and the second range do not overlap;

determine, while rendering the graphical object, the distance of the graphical object from the perspective point;

assign, while rendering the graphical object and based on the distance, a shader to the graphical object;

execute the shader assigned to the graphical object, wherein the first shader is configured to render higher quality shading than the second shader; and display the graphical object.

10. The computer readable storage medium of claim 9, wherein the first range and the second range are configurable while rendering the graphical object.

11. The computer readable storage medium of claim 9, wherein the tiered system further comprises a third shader, wherein the third shader is for processing the graphical object at a third range from the perspective point, and wherein the second range is closer to the perspective point than the third range.

12. The computer readable storage medium of claim 11, wherein the second shader is configured to render higher quality shading than the third shader.

13. The computer readable storage medium of claim 9, wherein a complexity of the graphical object does not change.

14. The computer readable storage medium of claim 9, the instructions further comprising functionality to:

establish a tiered system, for processing a graphical object at a distance from a perspective point, comprising at least a first level and a second level, wherein the first level is for processing the graphical object at a first range from the perspective point, wherein the second level is for processing the graphical object at a second range from the perspective point, and wherein the first range is closer to the perspective point than the second range;

determine, while rendering the graphical object, the distance of the graphical object from the perspective point;

assign, while rendering the graphical object and based on the distance, the graphical object to a corresponding level of the tiered system;

execute a virtual processor assigned to the graphical object, wherein the virtual processor executes every frame when the graphical object associated with the virtual processor is assigned to the first level, and wherein the virtual processor executes less than every frame when the graphical object associated with the virtual processor is assigned to the second level; and display the graphical object.

15. The computer readable storage medium of claim 9, the instructions further comprising functionality to:

establish a tiered system, for updating a 2D application texture in the 3D environment application at a distance from a perspective point, comprising at least a first level and a second level, wherein the first level is for updating the 2D application texture at a first range from the perspective point, wherein the second level is for updating the 2D application texture at a second range from the perspective point, and wherein the first range is closer to the perspective point than the second range;

determine, while rendering the graphical object, the distance of the 2D application texture from the perspective point;

assign, while rendering the graphical object and based on the distance, the 2D application texture to the corresponding level of the tiered system;

receive a new 2D application texture from a 2D application, wherein the 2D application executes independent of the 3D environment application;

update the 2D application texture, wherein the 2D application texture is updated every frame when the 2D application texture is assigned to the first level, wherein the 2D application texture is updated less than every frame when the 2D application texture is assigned to the second level; and display the 2D application texture.

16. A system for level of detail in a 3D environment application, comprising:

a memory;

a processor, operatively connected to the memory and configured for:

a processing module for:

establishing a tiered system, for updating a 2D application texture in the 3D environment application at a distance from a perspective point, comprising at least a first level and a second level, wherein the first level is for updating the 2D application texture at a first range from the perspective point, wherein the second level is for updating the 2D application texture at a second range from the perspective point, and wherein the first range is closer to the perspective point than the second range;

determining, while rendering the graphical object, the distance of the 2D application texture from the perspective point;

assigning, while rendering the graphical object and based on the distance, the 2D application texture to the corresponding level of the tiered system, and receiving a new 2D application texture from a 2D application, wherein the 2D application executes independent of the 3D environment application;

updating the 2D application texture, wherein the 2D application texture is updated every frame when the 2D application texture is assigned to the first level, and wherein the 2D application texture is updated less than every frame when the 2D application texture is assigned to the second level; and a rendering module, operatively connected to a display for:

displaying the 2D application texture.

17. The system of claim 16, wherein the processing module is further configured for:
- establishing a tiered system, for processing a graphical object at a distance from a perspective point, comprising at least a first level and a second level,
  - wherein the first level is for processing the graphical object at a first range from the perspective point,
  - wherein the second level is for processing the graphical object at a second range from the perspective point, and
  - wherein the first range is closer to the perspective point than the second range;
- determining, while rendering the graphical object, the distance of the graphical object from the perspective point;
- assigning, while rendering the graphical object and based on the distance, the graphical object to a corresponding level of the tiered system; and
- executing a virtual processor assigned to the graphical object,
  - wherein the virtual processor executes every frame when the graphical object associated with the virtual processor is assigned to the first level, and
  - wherein the virtual processor executes less than every frame when the graphical object associated with the virtual processor is assigned to the second level.

18. The system of claim 17, wherein the rendering module is further configured for:
- displaying the graphical object.

19. The system of claim 17, wherein the rendering module is further configured for:
- displaying the graphical object.

20. The system of claim 16, wherein the processing module is further configured for:
- establishing a tiered system, for shading a graphical object at a distance from a perspective point, comprising at least a first shader and a second shader,
  - wherein the first shader is for processing the graphical object at a first range from the perspective point,
  - wherein the second shader is for processing the graphical object at a second range from the perspective point, and
  - wherein the first range is closer to the perspective point than the second range;
- determining, while rendering the graphical object, the distance of the graphical object from the perspective point;
- assigning, while rendering the graphical object and based on the distance, a shader to the graphical object; and
- executing the shader assigned to the graphical object, wherein the first shader is configured to render higher quality shading than the second shader.

* * * * *